July 11, 1933.            B. CATALINE            1,917,575
WHEEL BALANCING
Filed Aug. 26, 1929
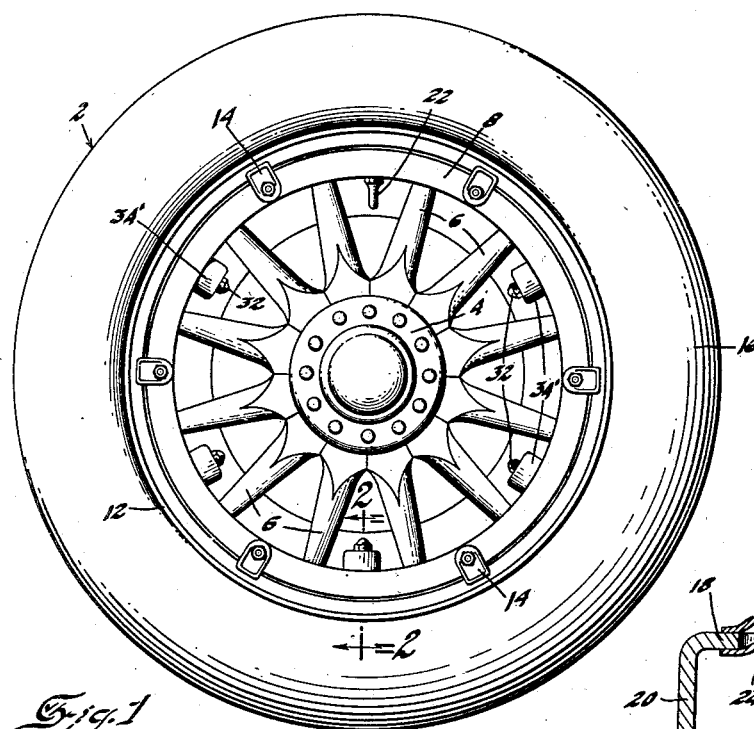
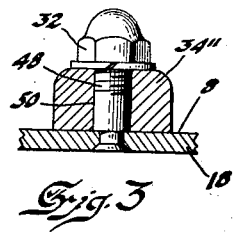
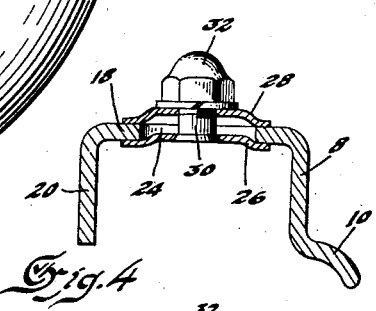
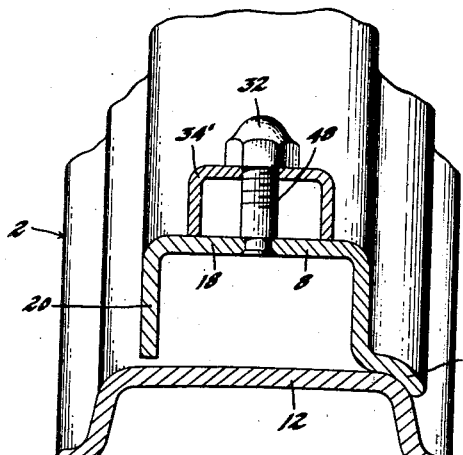
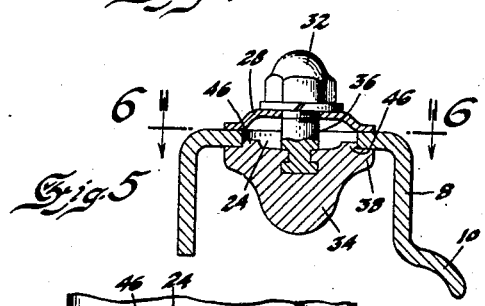
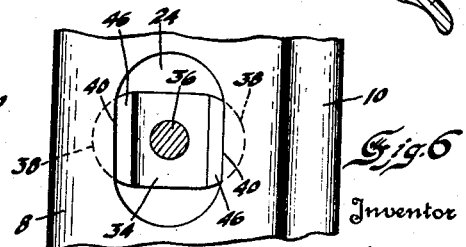
Inventor
Benton Cataline
Attorneys Patented July 11, 1933

1,917,575

UNITED STATES PATENT OFFICE

BENTON CATALINE, OF FLINT, MICHIGAN, ASSIGNOR, BY MESNE ASSIGNMENTS, TO KELSEY-HAYES WHEEL CORPORATION, A CORPORATION OF NEW YORK

WHEEL BALANCING

Application filed August 26, 1929. Serial No. 388,374.

This invention relates to wheels and has particular reference to the counterbalancing of wheels having a rim and tire mounted thereon.

The invention is more particularly concerned with the wheels of automotive vehicles which are known to at times be somewhat out of balance; that is, one side of the wheel will be heavier than the other. This difference in weight is caused by the tire valve and the openings in the rim and felly through which it passes and also by the tire which is not always uniform. A lack of symmetry of weight in the spokes and felly is also a cause of lack of wheel balance. By ascertaining at what particular point the wheel is lighter, a balanced wheel may be obtained by adding a weight to the lighter portion or portions and it is the object of the invention to obtain a true balance for a wheel. In the present invention a plurality of different sized weights is provided and by selecting the proper sized weight and placing it on the wheel at the lighter point, a balanced wheel may be obtained.

The object of the invention is accomplished by providing a plurality of elongated openings in the usual channel shaped felly and closing the openings by means of a pair of closure members fitted over the inside and outside of the channel at the opening and secured together by a bolt. These openings are preferably spaced about 60° apart. When the place at which the wheel is found to be lighter is discovered the closure plates are removed and a weight comprising a single piece of metal inserted through the longer side of the opening and rotated to cause the sides of the weight to catch against the narrower portion of the opening. The weight has a threaded shank secured thereto which projects beyond the opening and a nut applied to the threaded shank secures the weight in place through the intermediary of the innermost closure plate. As many of these weights as necessary may be applied to the wheel to secure proper balance.

As a modification of the invention there may be used a weight comprising a single piece of metal which is fastened directly to the inner periphery of the felly by means of a bolt passing through the felly and weight.

As a second modification a hollow weight may be used which is likewise secured to the inner periphery of the felly by means of a bolt. The mass of the weight will depend, of course, upon the size of the hollow.

On the drawing,

Fig. 1 shows a side view of a wheel with its tire and rim with the invention applied.

Fig. 2 is an enlarged sectional detail view on the line 2—2 of Fig. 1.

Fig. 3 is a view corresponding to Fig. 2 of a modification.

Figs. 4 and 5 are views corresponding to Fig. 2 of a further modification.

Fig. 6 is a section on the line 6—6 of Fig. 5.

Referring to the drawing, the numeral 2 indicates a wheel as a whole. The wheel has the usual hub 4, spokes 6 and felly 8. The felly is channel shaped as shown in Figs. 2, 4 and 5 and has the flange 10 at one side. A rim 12 is adapted to fit on the felly as shown in Fig. 2 and is held in place by means of the usual lugs 14. A tire 16 is received in the channel of the rim 12 in the usual way. By referring to Fig. 2, it will be seen that the channel of the felly has the base 18 and the sides 20. The tire is provided with the usual tire valve 22 which extends through openings in the rim and felly in the usual way and projects inwardly beyond the felly as shown in Fig. 1. The parts so far described are conventional and per se form no part of the invention.

The openings in the rim and felly as well as the tire valve 22 have some tendency to cause the wheel to be out of balance. The lack of balance of the wheel is accentuated by the tire which is seldom uniform, or has more rubber on one side than the other. All of these features make for inaccuracies of balance and it is the object of the present invention to equip the wheel with a means which will bring it into true balance. Accordingly the base 18 of the channel is provided with a plurality of openings 24, preferably five in number spaced substantially 60 degrees apart.

The openings 24 are elongated as shown in Fig. 6 or are longer in the circumferential direction of the felly 8. These openings are normally closed by the inner and outer washers or closure plates 26 and 28 held in position by means of the bolt 30 and nut 32. When the wheel is being tested for balance, it will be found that a part thereof is lighter than the remainder and in order to get proper balance one of the bolts 30 and its plates at the lighter point are removed and instead of the bolt and inner plate there is applied a weight 34 which has the threaded shank 36. The size or mass of the weight 34 of course will depend upon the amount which the wheel is out of balance, or the amount necessary to place the wheel in balance. As a number of different sized weights 34 are always in stock, it is but a matter of selecting the proper mass of weight to secure the desired number of pounds to balance the wheel.

If one weight is insufficient, two or more may be applied at two or more of the openings 24.

By referring to Fig. 6, it will be noted that the weight 34 may be inserted into the opening 24 by causing the longer portion of the weight to conform to the longer portion of the opening. By then turning the weight through 90 degrees the edges 38 of the weight are caused to abut or strike against the sides 40 at the narrower portion of the opening within the channel. The weights are provided with the shoulders 46 which fit within the opening and against the sides 40.

The outer plate or disc 28 is positioned as formerly and the nut 32 re-applied to the shank 36 to hold the weight 34 in place.

By referring to Figs. 5 and 6, it will be noted that the weight 34 is inside the channel of the felly 8. By placing the weight inside the channel, it is positioned further outward toward the periphery of the wheel and a greater counterbalancing effect is obtained. There is also obtained the advantage of having the weight where it is out of the way and concealed and thereby enhances the appearance of the wheel by removing a projecting portion to gather mud and dirt.

By referring to Fig. 2 it will be noted that instead of the weight 34 there is used the weight 34'. Weight 34' consists of a cup-shaped member the walls of which may be varied in thickness to secure cups having a greater or less amount of mass. These cups are fastened to the base 18 of the channel by means of the threaded shank 48 and nut 32. By changing the mass or size of the weight 34', the proper amount of counterbalancing effect may be obtained.

In Fig. 3 a third species is shown. The weight 34" comprises a single piece of metal provided with a central opening 50 for the reception of the shank 48. The weight is secured on the shank 48 by means of the usual nut 32. The proper counterbalancing effect is secured by selecting the appropriate size of weight 34" in accordance with the amount the wheel is out of balance.

In each instance it is to be noted that a single integral weight, or a weight comprising one piece is used. In this respect the invention distinguishes from prior constructions.

The best known art is Couture—1,667,344.

I claim:

1. In a wheel including a channeled felly, said felly having an opening in the base of the channel, means insertable through the opening from the inside of the felly into the channel and adapted to engage with the edge of the opening to counterbalance the wheel, and securing means engaging the edge of the opening and the weight to hold said counterbalancing means in position.

2. In a wheel including a channel shaped felly having a plurality of elongated openings in the base of the channel, counterbalancing weights insertable through the elongated portions of the openings and adapted to be turned and to engage the sides of the openings at the narrower part thereof, and means to secure said weights to the felly.

3. In a wheel including a channel shaped felly having a plurality of openings in the base thereof, a plurality of weights insertable from the interior periphery of the felly in said openings into the channel and engaging one edge of the openings, and means engaging the weights and the opposite edge of the openings to hold said weights in position.

4. In a wheel including a channel shaped felly having an elongated opening in the base of the channel, a counterbalancing weight insertable through the elongated portion of the opening and adapted to be turned and to engage the sides of the opening at the narrower part thereof, and means to secure said weight to the felly.

5. In a wheel including a channel shaped felly having a plurality of openings in the base of the channel, a plurality of weights insertable through said openings into the channel from the interior of the felly and engaging outer side portions of the felly, and means engaging the felly and the weights for holding said weights in position.

6. In a wheel including a channel-shaped felly having an opening in the base of the channel, a weight insertable through the opening and adapted to be turned to engage the felly, and means engaging the felly to secure the weight to the felly.

7. In a wheel including a rim member having a base portion provided with an opening therethrough, a weight insertable through the opening from one side of the base and having portions engaging the base at the opposite side thereof, and means for securing the weight to the rim member.

8. In a wheel including a rim member having a base portion provided with an opening therethrough, a weight insertable through the opening from one side of the base and having portions operable upon movement thereof relative to the rim member to engage the opposite side of the base, means for centering the weight relative to the rim member, and means for securing the weight to the rim member.

9. In a wheel including a rim member having a base provided with an elongated opening therethrough, an elongated counterbalancing weight insertable through the elongated portion of the opening and adapted to be turned to engage the ends of the weight with the base adjacent the longitudinal side edges of the opening, means upon the weight engageable with the aforesaid side edges of the opening to prevent rotation of the weight relative to the rim member, and means for clamping the weight to the rim member.

10. In a wheel including a rim member having a base provided with an opening therethrough, a counterbalancing weight insertable through the opening from one side of the base and having portions engaging the base at the opposite side thereof, means upon the weight engageable with opposite marginal edges of the opening to prevent rotation of the weight relative to the rim member, and means for clamping the weight to the rim member.

11. In a wheel, a rim member having a base portion provided with an opening therethrough, a weight insertable through the opening from the inner side of the rim member and having portions engaging the base at the outer side thereof, and means for securing the weight to the rim member including a plate member having portions engageable with the inner side of the base member and fashioned to conceal the opening therethrough.

12. In a wheel, a rim member having a base portion provided with an opening therethrough elongated in a direction circumferentially of the rim member, a weight having a width less than the circumferential length of the elongated opening and greater than the width of said opening permitting insertion of the weight through the opening in one position of the weight relative to the rim member and providing for engaging the weight with one side of the base member in another position of the weight relative to the rim member, means for securing the weight to the base aforesaid including a plate member having the marginal edge portions engaging the opposite side of the base and fashioned to conceal the elongated opening therethrough, and fastening means for clamping the weight and plate member to opposite sides of the base of the rim member.

In testimony whereof I affix my signature.

BENTON CATALINE.